Nov. 6, 1951     C. A. MARTIN     2,574,340
PEN HOLDER
Filed Jan. 13, 1949     4 Sheets—Sheet 1
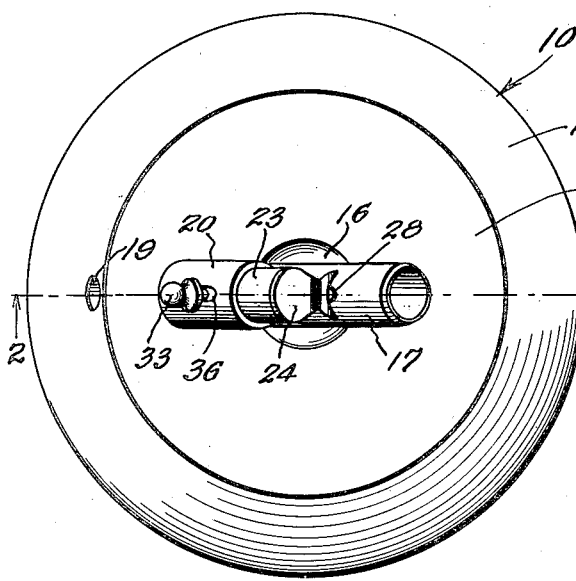
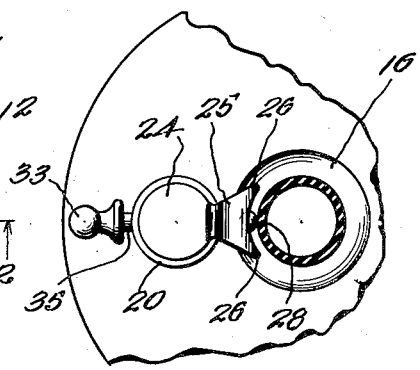
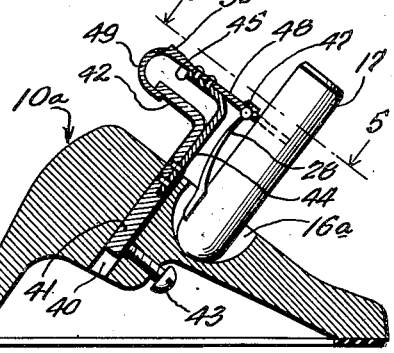
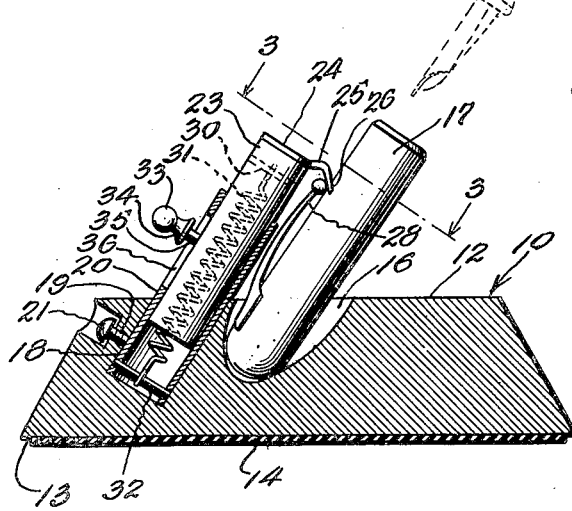
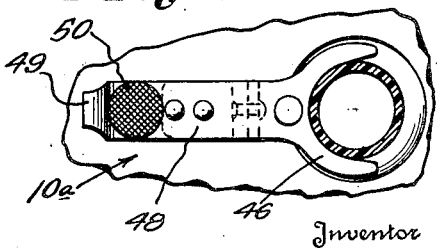
Inventor
Charles A. Martin
By Wilfred E. Lawson
ATTORNEY Nov. 6, 1951  C. A. MARTIN  2,574,340
PEN HOLDER
Filed Jan. 13, 1949  4 Sheets-Sheet 2
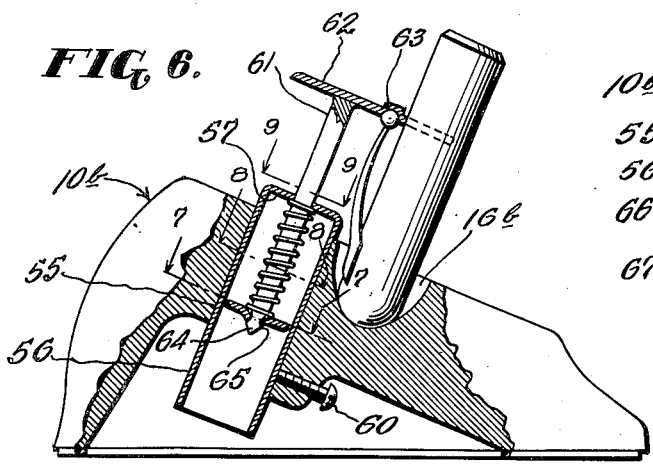
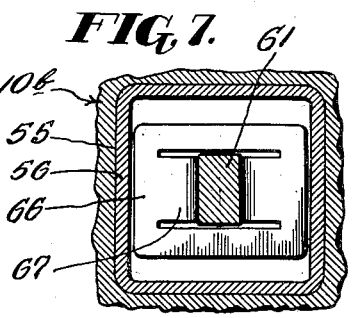
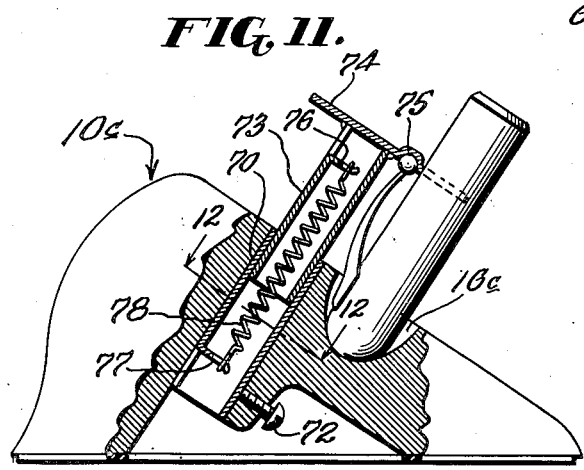
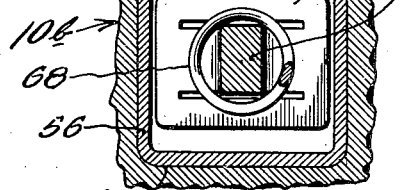
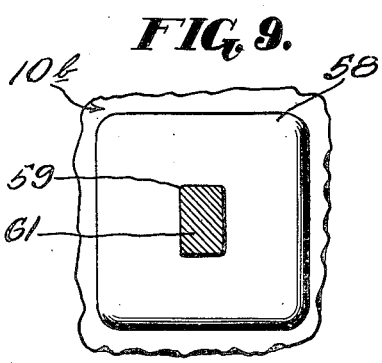
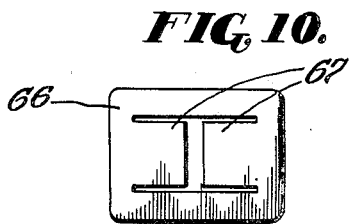
Inventor
Charles A. Martin
By Wilfred E. Lawson
ATTORNEY Nov. 6, 1951 — C. A. MARTIN — 2,574,340
PEN HOLDER
Filed Jan. 13, 1949 — 4 Sheets-Sheet 3
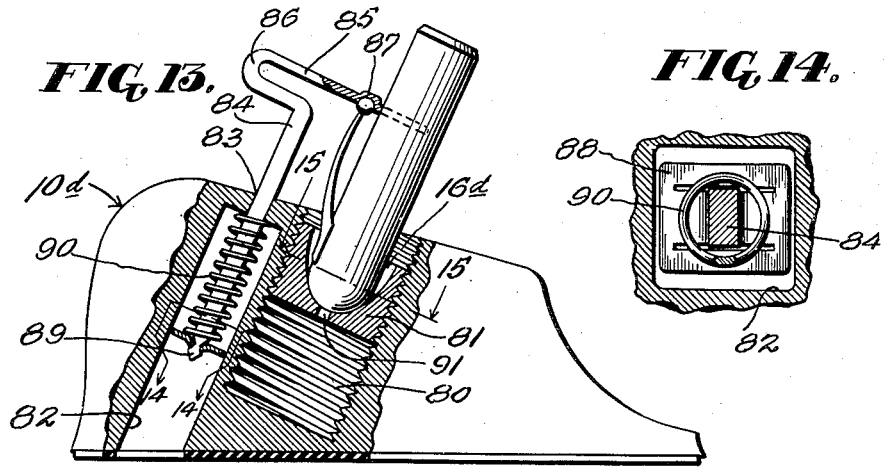
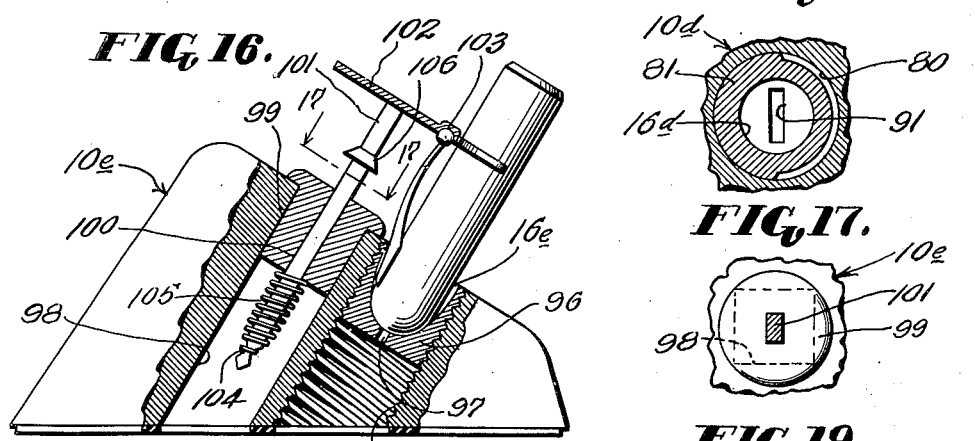
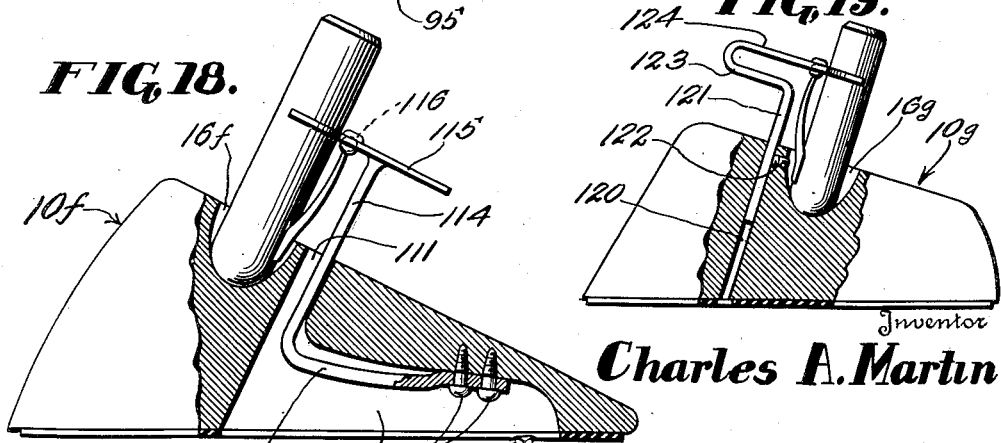
Inventor
Charles A. Martin Nov. 6, 1951     C. A. MARTIN     2,574,340
PEN HOLDER
Filed Jan. 13, 1949     4 Sheets-Sheet 4
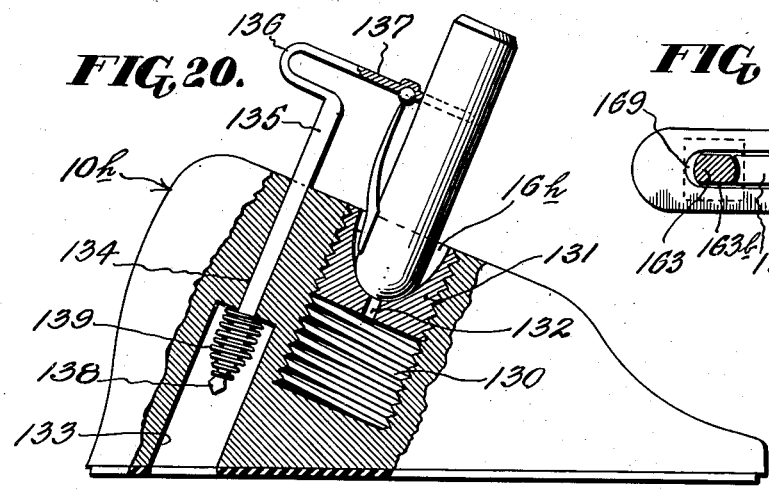
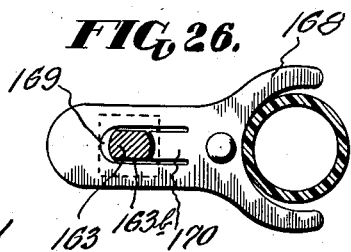
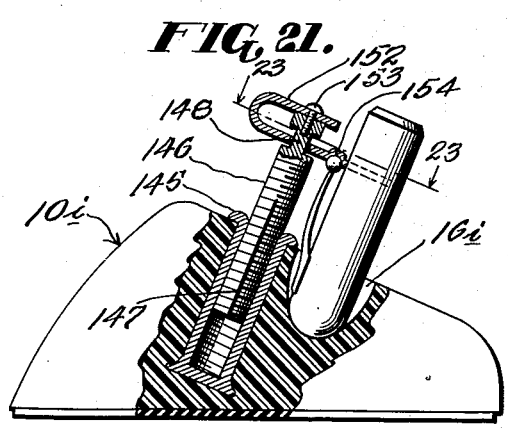
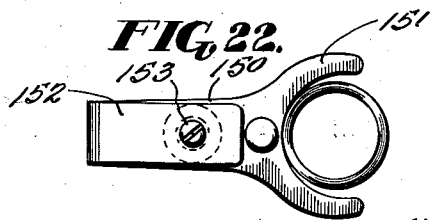
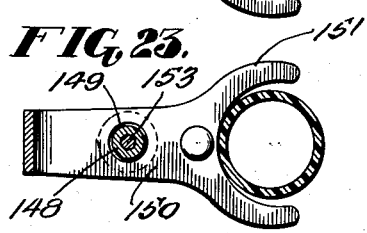
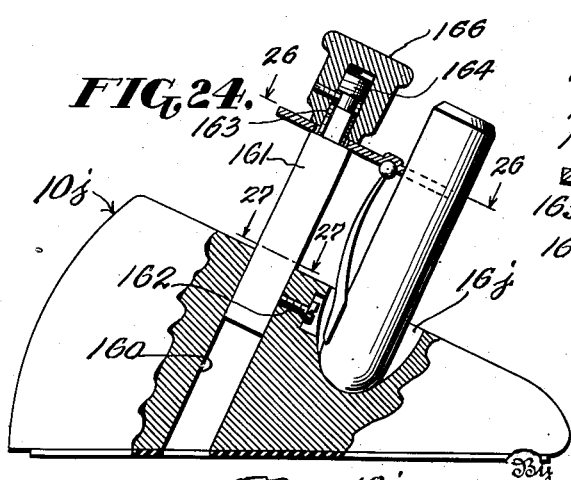
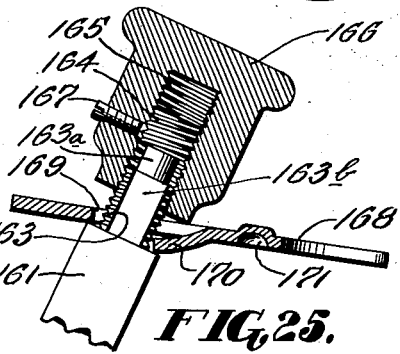
Inventor
Charles A. Martin
ATTORNEY Patented Nov. 6, 1951

2,574,340

UNITED STATES PATENT OFFICE 2,574,340

PEN HOLDER

Charles A. Martin, Tupelo, Miss.

Application January 13, 1949, Serial No. 70,610

19 Claims. (Cl. 120—108)

1

The present invention relates generally to pen holders and particularly to a holder adapted to sustain a pocket-type fountain pen on end and in an erect angular position from the surface of a desk or the like.

Desk fountain pens are well known in combination with holders for sustaining them in an erect angular position. Such holders usually comprise a base with a funnel-like tube closed at one end and flared open at the other. The closed end of the tube is attached by some suitable means to the base adapted to rest on the desk, whereby the tube serves to receive and support the point portion of the fountain pen. Heretofore, such fountain pens were designed purely for use as desk pens and the holders are not adapted to hold or support a pocket type fountain pen, as the pen point tubes or caps are secured permanently to the holder base.

An object of the present invention, therefore, is to provide a novel pen holder for pocket-type fountain pens, whereby such pens may be used as desk pens when desired.

Another object of the present invention is to provide novel means for detachably supporting the pen cap of a pocket-type fountain pen on a base novelly designed for the purpose.

A further and more specific object is to provide a novel means for detachably supporting the cap of a conventional pocket-type fountain pen wherein there is provided a resilient holding element which cooperates with the usual clasp or clip carried by the fountain pen cap to maintain the cap in the desired upright position on the base for use.

Still another object of the invention is to provide in a device for supporting or maintaining the cap of a conventional pocket-type fountain pen in upright position, a base having a receiving pocket in which the closed end of the cap is positioned together with a spring actuated reciprocable element connected to the base adjacent to the pocket and carrying a means whereby it may be engaged against the end of the conventional spring clip carried by the cap to force the cap down into the pocket and thus maintain the cap firmly in the desired position for use.

Other objects and advantages of the invention will appear as the description of the same proceeds and the invention will be best understood from a consideration of the following detailed description taken in connection with the accompanying drawings forming a part of the specification, with the understanding, however, that the invention is not to be limited to the exact details

2 of construction shown and described since obvious modifications will occur to a person skilled in the art.

In the drawings:

Figure 1 is a top plan view of one embodiment of my novel pen holder showing a cap of a pocket-type fountain pen held therein.

Figure 2 is a view in cross section of the holder taken along the line 2—2 of Figure 1, showing in detail a means for holding the end cap of a fountain pen and a fountain pen cap in place in the holder.

Figure 3 is a sectional view taken on the line 3—3 of Figure 2 showing the coaction between the holder and the pen cap clasp.

Figure 4 is a sectional view of a second embodiment of the invention, the line of section corresponding to the line indicated for Figure 2.

Figure 5 is a section on the line 5—5 of Figure 4.

Figure 6 is a view partly in elevation and partly in section illustrating another embodiment of the invention.

Figure 7 is a sectional view taken substantially on the line 7—7 of Figure 6.

Figure 8 is a sectional view taken substantially on the line 8—8 of Figure 6.

Figure 9 is a sectional view taken on the line 9—9 of Figure 6.

Figure 10 is a view in plan of the spring retaining plate attached to the stem of the holder shown in Figure 6.

Figure 11 is a view partly in section and partly in elevation of another embodiment of the invention.

Figure 12 is a sectional view taken on the line 12—12 of Figure 11.

Figure 13 is a view partly in elevation and partly in section of a still further embodiment of the invention.

Figure 14 is a sectional view taken substantially on the line 14—14 of Figure 13.

Figure 15 is a sectional view of a portion of the base itself taken substantially on the line 15—15 of Figure 13.

Figure 16 is a view partly in elevation and partly in section of still another embodiment.

Figure 17 is a sectional view taken on the line 17—17 of Figure 16.

Figure 18 is a view partly in section and partly in elevation of a still further embodiment.

Figure 19 is a view partly in section and partly in elevation of another embodiment of the invention.

Figure 20 is a view partly in elevation and partly in section of a still further embodiment.

Figure 21 is a view partly in elevation and partly in section of yet another embodiment.

Figure 22 is a view in plan of the pen cap clasp engaging head of the device illustrated in Figure 21.

Figure 23 is a sectional view taken substantially on the line 23—23 of Figure 21.

Figure 24 is a view partly in elevation and partly in section of a still further embodiment of the invention.

Figure 25 is a detailed sectional view on an enlarged scale of a part of the structure shown in Figure 24.

Figure 26 is a sectional view taken substantially on the line 26—26 of Figure 24.

Figure 27 is a sectional view taken substantially on the line 27—27 of Figure 24.

The embodiment of the present invention illustrated in Figures 1 to 3 comprises a weighted base 10 having upwardly tapering sides 11, a top portion 12, and a bottom portion 13. Secured to the bottom 13 is a pad 14 of soft material, such as felt, rubber or the like to prevent the base 10 from scratching or marring the surface of a desk on which it may be placed.

The top portion 12 of the base 10 has defined therein a substantially conical socket 16, see Figure 2, for receiving the closed end of a fountain pen cap 17. The conical shape of the socket 16 provides for the reception of any conventional fountain pen cap regardless of whether the cap is hexagonal, square or round in shape.

The apex of the socket 16 is preferably slightly off the precise center point of the top 12, so as to better provide for an angular canting of the pen cap 17 from its position in the socket 16.

Adjacent the socket 16 is defined a cylindrical socket 18, as by boring downwardly at an angle into the base 10 from top 12. The angular position thus imparted to the interior bore of the socket 18 provides for the angular slant of the fountain pen cap 17, as will hereinafter be explained, as the description proceeds.

Fixed in the cylindrical bore 18 is a cylinder or tube 20 open at each end. To secure the tube 20 in the bore 18, the side 11 is bored out at 19 to provide for a securing member, such as screw 21, which threads through a portion of the base 10 into engagement with the lower end of the tube 20.

Telescopically mounted inside of the tube 20 is a second relatively small cylinder or tube 23 open at its lower end, and closed by a cap 24 at its upper end. The upper end of tube 23 projects beyond the upper end of tube 20, and the cap 24 on the end of tube 23 carries a forked tongue 25, which may be an integral part of cap 24.

The forked tongue 25 is curved downwardly at each tine 26 and 27, so as to form a seat or notch that holds the free end of a clip 28 of the fountain pen cap 17, see Figure 2.

Just below the cap 24 and transversely mounted in the tube 23 is a pin 30, see Figure 2, to which is fastened one end of a spring 31. The other end of the spring 31 fastens to a second transverse pin 32 in the lower end of tube 20, so that the convolutions of the coiled spring 31 are confined within the bores of the tubes 20 and 23. Thus normally the spring 31 pulls the tube 23 downward into the tube 20. Accordingly, the cap 24 and forked tongue 25 serve to yieldably pull down on the clip 28 of the fountain pen cap 17, shown in Figure 2, and thus hold the same in an erect angular position from the conical pocket 16.

To facilitate manipulation of the pen cap holding mechanism, there is provided a knob 33 having a skirt portion 34 and a threaded shank 35. The shank 35 threads in a small threaded bore in the side of tube 23, and projects outwardly therefrom through an elongated slot 36 extending longitudinally along the tube 20. This slot 36 is made of a predetermined length, so as to cooperate with the projection and retraction of the telescopically mounted tube 23. For example, the skirt 34 of the knob 33 slides outside the slot 36, and the shank 35 abuts against each end of the slot to limit the extent of movement of the inner tube 23, and particularly at the upper end of the slot 36, so as to always retain the tube 23, at least partially within the tube 20.

A second embodiment of the invention is illustrated in Figures 4 and 5 wherein the base, of any suitable form, is designated 10a and the pen cap holding socket is designated 16a. In this embodiment the base is provided with a passage 40 of rectangular cross section parallel with the longitudinal axis of the socket 16a, in which is slidably mounted a stem 41, the upper end of which has the backwardly directed portion 42. This stem is held in the suitable adjusted position by means of the set screw 43.

Carried upon the upper end of the stem 41 by means of the upstanding bracket 44 which has the backwardly turned upper end portion 45, is the forked member 46. The bracket member is of flat resilient material so that the portion 45 thereof may be readily bent or flexed to raise or lower the cap engaging fork 46 as desired to engage the ball end of the pen cap clip in the socket 47.

The member 46 has the rearwardly extending tongue portion 48 which is secured to the spring bracket as illustrated and this tongue portion has the downwardly turned or turned under movement limiting finger 49 which engages beneath the rearwardly turned terminal portion 42 of the stem 41 as shown. By pressing the finger upon the roughened disk portion 50 of the cap holder, the forked forward end portion 46 may be caused to raise so as to disengage the pen cap clip or to facilitate the putting of the clip and pen cap in the position shown in Figure 4. It will be understood that the part 41 will be adjusted and held by the screw 43 in such position that only a slight down pressure upon the portion 50 of the cap holder is necessary to facilitate the engagement of the clip under the holder or its disengagement therefrom and that when the pressure is released upon the part 50 the spring action of the bracket 44 will press the part 46 down to engage the clip.

Figures 6 to 9 inclusive illustrate a third embodiment of the invention wherein the base is generally designated 10b and may be of any desired form. This base has in the top thereof the pen cap receiving socket 16b to receive the pen cap as shown.

Also formed in the base 10b on a line paralleling the longitudinal axis of the socket 16b, is a passage 55 of square or rectangular cross section as shown in Figures 7 and 8. In this passage is slidably mounted the tube 56 of corresponding cross sectional form and which tube is open at its lower end and has a head 58 in its upper end which has a central opening 59 therein of polygonal cross sectional design as illustrated in Figure 9. This tube 56 is maintained in longitudinal adjusted position by the set screw 60.

Slidably extended through the opening 59 is a stem 61 of the same cross sectional form as the opening and carrying upon its upper end the forked head plate 62 which is adapted to straddle the pen cap as shown and which has formed from the underside therein a socket 63 to receive the ball end of the pen cap clip as illustrated.

The lower or inner end of the stem 61 has the form of a spear head as indicated at 64 whereby opposite shoulders 65 are formed. This head 64 of the stem is connected with a spring retaining plate 66 through the medium of two resilient tongues 67 which are cut from the plate as shown in Figure 10 and have their free ends in spaced opposing relation whereby the head 64 of the stem may be forced between them, the tongues springing back toward their original positions to engage under the shoulders 65 and thereby secure the plate on the stem. This plate 66 is of polygonal design so that it will fit within the tube 56 in the manner illustrated.

Encircling the stem 61 and interposed between the top 57 thereof and the plate 66, is a spring 68 which by reason of its constant tendency to expand tends to pull the cap engaging plate 62 and the stem 61 downwardly toward the top of the base so as to firmly secure the pen cap in position in the manner illustrated.

Figures 11 and 12 illustrate a fourth embodiment of the invention wherein the base, of any desired form, is generally designated 10c and the pen cap receiving socket formed in the top is generally designated 16c.

As in the other forms the base in this form is provided with a passage of polygonal cross section, here shown as being square, and designated 70. This passage is parallel with the longitudinal axis of the socket 16c and it has fixed therein the sleeve 71 of corresponding cross sectional form. The sleeve is held against movement and in the desired adjusted position by the set screw 72.

Slidably engaged in the sleeve 71 from the upper end is the tube 73 which carries upon its upper end the forked plate 74 which at one end engages around the cap when the latter is positioned in the socket 16c in the manner shown. This plate, like the previously described ones has a socket pressed therein from the underside as indicated at 75 to receive the ball of the pen cap securing clip.

The upper end of the tube 73 has a portion of one side wall cut away and pressed inwardly to form the inwardly projecting finger 76 and a correspondingly formed finger 77 is formed from and extends inwardly in the sleeve 71 at the lower end thereof. These fingers 76 and 77 are connected by the contractile spring 78 which thus functions to constantly urge downward movement of the tube 73 into the sleeve.

In view of the description of the preceding embodiments the operation of this fourth embodiment will be readily apparent.

Figures 13 to 15 inclusive illustrate a fifth embodiment wherein the base, of any suitable or desired form, is generally designated 10d. This form is provided, like the other forms, with a socket for the reception of the pen cap but such socket is formed in an adjustable member rather than directly in the body of the base. As shown the base is provided with a tapped bore 80 in which is threaded the round exteriorly threaded nut 81, in the top of which is formed the cap receiving socket which is designated 16d.

Also formed in the base 10d is the passage 82 which is parallel with the bore 80, both of which are inclined as in the preceding embodiments. The passage 82 terminates short of the top of the base as shown and the intervening portion of the base has the small opening 83 formed therethrough on the longitudinal center of the passage 82 and through this opening, which is of polygonal cross section, extends the stem 84 which is of similar cross sectional form and which has at its upper end the cap engaging plate 85 which is connected with the stem by the lateral or goose neck extension 86. The plate 85 is forked to receive the pen cap and has a socket 87 in its underside to receive the ball of the cap holding clip.

The passage 82 is of rectangular form and positioned therein is a spring supporting plate 88 which is of the same character as the plate 66. Likewise the lower end of the stem 84 is of spear form as in the described third embodiment and is here indicated at 89 to engage through the plate 88 to hold the latter thereon and in the passage 82. Between the plate 88 and the upper end of the passage 82 is the expansion spring 90 which normally urges downward movement of the stem 84 for the obvious purpose of holding the cap firmly in position in the socket 16d. In this form of the invention it will be apparent that instead of providing means for adjusting the position of the clip engaging plate as in the preceding forms the necessary adjustment is in the cap supporting part of the device. To facilitate the adjustment of the nut 81 the bottom part thereof is provided with a slot 91 in which may be engaged an end of a screw driver or other suitable instrument for turning the nut.

Figures 16 and 17 illustrate the sixth embodiment of the invention wherein the base, of any suitable form, is generally designated 10e. This base likewise has a tapped bore therein which is generally designated 95 and in which is threaded the nut 96 which has formed in the top thereof the cap receiving socket 16e. The bottom of the nut has a slot 97 for the same purpose as the slot 91 in the nut 81.

Paralleling the axis of the bore 95 is a passage 98 formed in the base and having a polygonal cross sectional form as shown. Secured in the upper end of this passage is the plug 99 which has formed along the axial center thereof the through passage 100 which is of polygonal form and slidably receives the stem 101 which carries upon its upper end the forked plate 102 which engages partway around the pen cap and which has the socket 103 formed in its underside to receive the ball of the pen cap securing clip.

The lower end of the stem 101 which is within the passage 98 below the plug 99 is reduced in diameter or constricted as indicated at 104 and secured in this restricted portion is an end of a coil spring 105, the upper end of which bears against the underside of the plug 99. Thus the spring normally tends to urge the stem and plate downwardly to hold the plate in firm engagement with the pen clip. Downward movement of the stem is limited by the collar 106 carried thereon above the plug 99.

Figure 18 illustrates a seventh embodiment of the invention. In this form the body, of any desired form, is generally designated 10f and in the sloping or inclined top face thereof is formed the pen cap receiving socket 16f.

In the underside of the body is a chamber 110 from which a passage 111 leads upwardly and opens through the top of the base body, the passage being at the low side of the socket 16f as shown.

Secured to the top wall of the chamber at 112, is an arm 113 of suitable spring material which has an upwardly extending stem portion 114 which passes through the passage 111 to a substantial distance above the inclined top surface of the base. Upon the upper end of this stem 114 is mounted the forked plate 115 corresponding to the plates or head units hereinbefore described which plate has the socket 116 in its underside to receive the ball end of the pen cap securing clip. As will be readily apparent the spring action of the arm 113 is designed to pull the plate 115 downwardly so as to maintain the cap firmly in the socket 16f and release of the cap is effected by pulling up upon the plate 115 against the tension of the spring arm until the end of the clip is released from the socket 116. The same action is performed for the purpose of placing the pen cap in the socket as will be readily apparent.

Figure 19 illustrates an eighth form of the invention wherein the base is generally designated 10g and has formed in the top surface the cap receiving socket 16g. Adjacent to the pocket and parallel with the longitudinal axis thereof is formed in the base the bore 120 in which is slidably engaged the stem 121 which is secured in adjusted position by the set screw 122 which is threaded into the wall of the socket 16g to the passage 120 as illustrated.

The upper end of the stem 121 carries by means of the integral rearwardly extending spring goose neck 123, the pen clip engaging plate 124 of a form similar to the plate 85.

Figure 20 illustrates a ninth embodiment of the invention wherein the base is generally designated 10h and which has formed therein from the top the tapped bore 130 in which is threaded the nut 131 which has formed in the top thereof the pen cap receiving socket 16h and which also has in the bottom the slot 132 to facilitate the engagement of a suitable instrument with the nut for turning the latter.

Paralleling the bore 130 is the passage 133 the upper end of which is continued through the body by the small passage 134 in which is slidably mounted the stem 135. Upon the upper end of the stem is carried by means of the rearwardly extending resilient or spring goose neck 136, the cap clip engaging forked plate 137 which is of the same form as the plates and supporting stems shown in Figures 13 and 19.

Within the passage 133 the lower end of the stem 135 is reduced as indicated at 138 and has secured to such reduced end one end of an expansion spring 139 which surrounds the stem and bears at its other end against the top end of the passage 133 and normally urges downward movement of the stem and the plate carried thereby.

Figures 21 to 23 illustrate a tenth embodiment of the invention wherein the base, of any desired form or size is generally designated 10i and which may be made of hard rubber, synthetic resin or other similar material. In the sloping top of the base is formed the pen cap receiving socket 16i and adjacent to this socket and paralleling the longitudinal axis thereof there is fitted in the base as by molding or in any other suitable manner, the interiorly threaded sleeve 145 in which is threadably engaged a threaded post 146. This post 146 is split throughout the major portion of its length as indicated at 147 whereby a friction threaded engagement will be obtained which will maintain the post against turning movement when no pen cap is in place in the holder.

The upper end of the post 146 has a reduced portion forming a neck 148 and this neck, as shown in Figure 23 passes through an aperture 149 in the arm portion 150 which is formed integral with the forked cap engaging member 151. The rear end of the arm portion, beyond the neck 148 from the forked portion 151 is bent back over the top of the post as indicated at 152 and secured to the post by the screw or other securing element 153. The member or plate 151, as in the preceding forms is suitably formed at 154 for engagement with the ball end of the pen cap securing clip and it will be readily apparent that since the arm portion 150 is of a thickness less than the length of the neck portion 148, some slight amount of movement is permitted the forked plate whereby to facilitate the ready application and removal of the cap.

Figures 24 to 27 inclusive illustrate the eleventh embodiment of the invention wherein the base portion which may be of any suitable form, is generally designated 10j. Formed in the sloping top of the base 10j is the pen cap receiving socket 16j and paralleling the longitudinal axis of this socket is a passage 160 in which is fitted an end of a post 161 of polygonal cross section and adapted to slide up and down in the passage.

Threaded in the material of the body transversely to the passage 160 from the wall of the socket 16j, is a set screw 162 which engages the post or stem 161 to secure the latter in adjusted position.

The upper end of the stem 161 has the reduced terminal portion 163 which is turned down to a smaller diameter between its end to form the reduced circular neck 163a. From the neck 163a the stem is completely circular and screw threaded forming the head 164. Below the neck 163a the stem has the opposite flattened faces 163b and the curved parts thereof are screw threaded as shown.

The stem 161 is threaded in a tapped bore 165 formed axially in and from the lower end of a nut body 166.

Threaded through the wall of the body 166 perpendicular to the bore 165 to project into the same is a set screw 167 which is adapted to enter the space between the threaded sections which are separated by the circular portion 163 to limit the axial movement of the nut.

The numeral 168 designates the forked plate which engages the pen cap and this plate has an elongated opening 169 therein through which the terminal portion 163 of the stem passes. The flat faces 163b of the stem portion oppose the long edges of the opening 169 whereby the plate is held against turning. From one end of the opening 169 there extends the spring tongue 170 which is offset from the plane of the plate 168 and bears against the shoulder formed by the upper end portion of the stem 161 around the neck 163. This spring tongue 170 tends to lift the forked end of the plate 168 and thus it will be seen that after the pen cap has been placed in position as illustrated in Figure 24 the nut 166 may be threaded downwardly until the set screw comes into line with the circular portion 163a of the neck whereupon it is threaded inwardly to engage under the head 164 and thus hold the nut against outward or retrograde movement. However, the nut may be turned so as to be threaded farther inwardly and in this manner downward pressure is applied to the plate 168 against the action of the spring tongue 170, to flatten the spring in the manner shown in Figure 24 and thus cause the socket 171 which is formed in the underside of the forked plate to be brought down into engagement with the ball end of the cap retaining clip as illustrated.

I claim:

1. A holder for a fountain pen cap, comprising a base having a top, the base being provided with a socket having an open top directed through the said top of the base to receive the top end of the pen cap, the base also having a passage therein substantially parallel with the longitudinal axis of said socket, an elongate member having one end extended into said passage and extending at its other end a substantial distance above the top of the base, a pen cap engaging element carried upon the said other end of said elongate member, said elongate member being movable longitudinally in said passage, and means connected with said elongate member for urging movement of the pen cap engaging element into holding connection with a pen cap supported in said socket.

2. A holder of the character stated in claim 1, wherein the said pen cap engaging element comprises a plate formed to provide a fork for partially encircling the pen cap and means forming a part of said plate for engaging the free end of a spring clip carried by the cap.

3. A holder for a fountain pen cap, comprising a base having a top, the base having an upwardly directed open socket for receiving the top end of a fountain pen cap, the base also having a passage therein adjacent to and parallel with the longitudinal axis of the socket, a relatively long member having an end portion disposed in the passage for longitudinal movement therein and having the opposite end portion extended a substantial distance above the said top of the base, and a forked member carried upon the said other end of said long member and extending laterally therefrom for partial engagement around a pen cap supported in said socket, said forked member being adapted for engagement with the free end of a clasp member carried by the pen cap.

4. A pen cap holder of the character stated in claim 3, with means connected with said long member for urging movement of said forked member into holding engagement with the cap and clip.

5. A holder for a fountain pen cap as set forth in claim 3, with spring means connected with said long member and constantly urging movement thereof in a direction to force the forked member into holding engagement with the pen clip.

6. A holder for a fountain pen cap carrying a spring clip, comprising a base having a top, the base having an upwardly opening socket in the top thereof to receive the top end of the pen cap, a relatively long member, means supporting said long member adjacent to the socket and for movement on a line paralleling the axial center of the socket, and a forked element carried by said long member and directed therefrom for engagement with a pen cap supported in said socket, said forked member being formed to receive the free end of a spring clip carried by the pen cap to hold the cap in the socket when the forked member is moved toward the socket.

7. A holder for a fountain pen carrying a spring clip, comprising a base having a top, the base having an upwardly opening socket in the top to receive the top end of a pen cap, the base also having a passage formed therein adjacent to the socket, a stem slidably extended into the passage from the top end thereof, a plate carried upon the lower end of the stem, means maintaining the stem against turning movement in the passage but permitting axial movement of the stem, spring means encircling the stem and enclosed within the passage and engaged at one end against said plate, means securing the other end of the spring in the top of the passage whereby to normally urge inward movement of the stem, and a holding plate carried upon the upper end of the stem and adapted to engage against the free end of the spring clip of a pen cap mounted in said socket.

8. A fountain pen cap holder of the character stated in claim 7, wherein the said holding plate carried upon the upper end of the stem is connected to the stem by a resilient goose neck.

9. A holder for a fountain pen cap carrying a spring clip, comprising a base having a top, the base having an upwardly opening socket in the top to receive the top end of a pen cap, the base also having a passage formed therein adjacent to the socket and opening through the top of the base, a relatively long element slidably extended into the passage from the top of the base, means for holding the element in adjusted position in the passage, a plate member connected to the upper end of the element, said plate member being adapted to position adjacent to a cap mounted in the socket and to engage the free end of a spring clip carried by the cap.

10. The invention as set forth in claim 1, with an upwardly directed open ended cylinder in said passage, said elongate member comprising a second cylinder slidably positioned in the first cylinder, said cap engaging element forming a closure cap for the second cylinder and including a tongue, an element carried by and directed transversely of said second cylinder below the cap thereon, and said means for urging movement of the pen cap engaging element comprising a spring attached to the first cylinder adjacent to the lower end thereof and extending through the second cylinder and connected to said element, and means for moving said second cylinder in said first cylinder against the tension of said spring.

11. The invention according to claim 10, wherein the last named means comprises a bolt secured to said second cylinder and extending through a slot formed longitudinally of the first cylinder, and a knob carried by the outer end of said bolt.

12. The invention as set forth in claim 1, with an upwardly directed, elongate hollow member in the passage and having a top wall provided with a central opening, said first elongate member passing through said opening, a plate secured upon the lower end of the first elongate member and lying transversely of the hollow member, and said movement urging means comprising a spring encircling the lower part of the first elongate member and interposed between said plate and said top wall.

13. The invention according to claim 12, wherein said hollow member is of polygonal cross sectional form and said plate has a straight side edge portion in sliding contact with a flat side of the hollow member.

14. The invention as set forth in claim 1, with an upwardly directed, elongate hollow member in the passage and having a top wall provided with a central opening, said first elongate member passing through said opening, a plate secured upon the lower end of the first elongate member and lying transversely of the hollow member, said movement urging means comprising a spring encircling the lower part of the first elongate member and interposed between said plate and said top wall, and means securing the hollow member adjustably to the base.

15. The invention as set forth in claim 1, wherein said elongate member is hollow and open at the end within the passage, said movement urging means comprising a coil spring disposed in the elongate member and extending through the open end thereof into the passage, means securing the lower end of the spring in the passage, and means for attaching the upper end of the spring to said elongate member.

16. The invention as set forth in claim 1, wherein said movement urging means comprises a coil spring encircling the lower end portion of said elongate member, means coupling the lower end of the spring with the lower end portion of said member, and means at the upper end of said passage providing a surface against which the upper end of the spring bears.

17. The invention as set forth in claim 1, wherein the base includes a circular part in which said socket is formed, said circular part being threadably joined with the other part of the base for adjustment lengthwise of said axis.

18. The invention as set forth in claim 1, wherein said elongate member is screw threaded in said passage, and said movement urging means comprises a resilient element secured to the top end of the elongate member and to the cap engaging element.

19. The invention as set forth in claim 1, wherein said elongate member has a top end portion of reduced diameter forming a shoulder, a nut threaded on the reduced portion, said cap engaging element comprising a plate having an opening through which said reduced portion extends, and said movement urging means comprises a spring tongue carried by the plate and having a free end in offset relation to the plane of the face of the plate nearest to the shoulder and resting upon the shoulder.

CHARLES A. MARTIN.

REFERENCES CITED

The following references are of record in the file of this patent:

UNITED STATES PATENTS

| Number | Name | Date |
|---|---|---|
| 1,516,489 | Barton | Nov. 25, 1924 |
| 1,730,487 | Utzman | Oct. 8, 1929 |
| 1,892,181 | Tefft | Dec. 27, 1932 |
| 1,922,891 | Griffith | Aug. 15, 1933 |
| 2,151,440 | Pollak | Mar. 21, 1939 |
| 2,319,377 | Wallace et al. | May 18, 1943 |